(No Model.)
H. W. LIBBEY.
ANTI FRICTION BEARING FOR VEHICLE WHEELS.
No. 413,525. Patented Oct. 22, 1889.
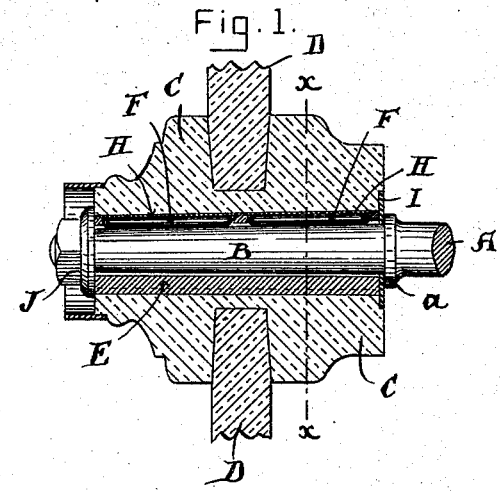
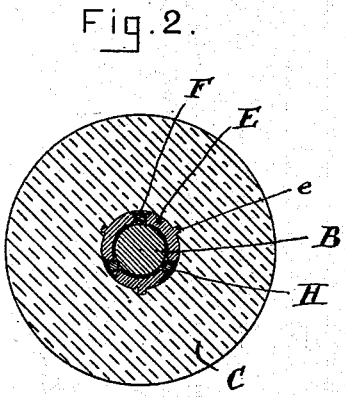
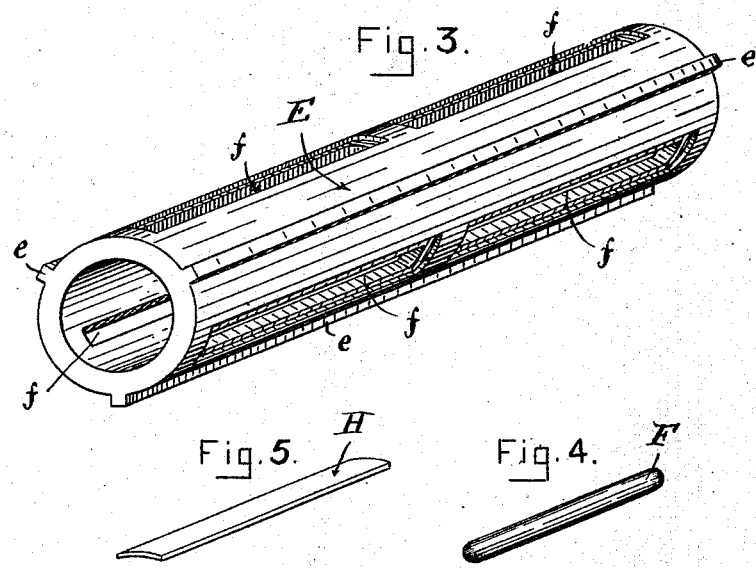
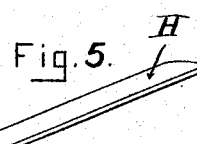
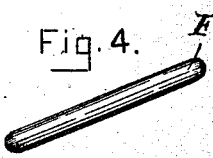
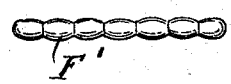
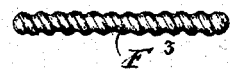
Witnesses
J. George Pettzen
Bushrod Morse
Inventor.
Hosea W. Libbey
by Edwin Planta
Attorney.

UNITED STATES PATENT OFFICE.

HOSEA W. LIBBEY, OF BOSTON, MASSACHUSETTS.

ANTI-FRICTION BEARING FOR VEHICLE-WHEELS.

SPECIFICATION forming part of Letters Patent No. 413,525, dated October 22, 1889.

Application filed March 5, 1889. Serial No. 301,848. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Sleeves and Anti-Friction Bearings for Wheels, of which the following, taken in connection with the accompanying drawings, is a specification.

My invention has for its object the diminution of friction in axle-bearings of vehicles; and the invention consists in certain details of construction hereinafter fully described, and pointed out in the claims.

Referring to the accompanying drawings, Figure 1 represents a longitudinal vertical section through a wheel-hub embodying my invention. Fig. 2 is a cross-section of same, taken on line $x\ x$ of Fig. 1. Fig. 3 is a perspective view of the sleeve that embraces the axle, drawn to a larger scale. Fig. 4 is a view of one of the anti-friction rollers. Fig. 5 is a view of one of the covering-plates. Fig. 6 shows a corrugated roller, and Fig. 7, a series of balls to be used instead of a roller. Fig. 8 shows a spirally-corrugated roller.

A represents the axle; B, the axle-spindle; C, the hub, and D the spokes. E is a sleeve of metal, the internal diameter of which is slightly larger than that of the axle-spindle and tapering to conform to the axles now in use, and on its peripherical face are formed (preferably three) longitudinal ribs or projections $e$.

Between the ribs or projections $e$ slots F are formed through the sleeve E. I prefer to have six of these slots, as shown, arranged in pairs longitudinally, so that there are only three circumferentially. A recess is formed in the sleeve around each of these slots to receive as a cover a plate H, and the anti-friction rollers F are of a diameter to just fit between the under side of the plates H and the axle-spindle B, so that the outer surface of the sleeve between the ribs $e$ is perfectly smooth when adjusted upon the spindle with the rollers and plates.

The hub C is bored out the exact size of the diameter of the sleeve E and grooves are cut therein to correspond with the projections $e$ on the sleeve, so that when the sleeve is inserted it is prevented from turning, while the hub forms a bearing for the plates H. I prefer to insert a plate I on the inner side of the hub for the collar $a$ of the axle to work against, and the hub is held on the spindle by a washer and nut J in the usual manner.

Instead of plain rollers F, as shown in Fig. 4, corrugated rollers F', as shown in Fig. 6, may be employed, or a series of balls F², as shown in Fig. 7, or spirally-corrugated rollers F³, as shown in Fig. 8, may be used.

In applying this anti-friction bearing I first place the sleeve E around the spindles B, then insert the rollers F and plates H, and then force the sleeve into the recess in the hub and secure the hub on the axle by the nut J.

It will be seen that by this construction of bearing all friction is between the spindle B, rollers F, and plates H, and, as the spindle is only touched in three points of its diameter and the rollers are free to rotate, the friction is reduced to a minimum.

What I claim as my invention is—

1. In an anti-friction bearing for vehicles, a sleeve having longitudinal ribs on its peripherical face and slots between said ribs, in combination with friction-rollers and covers or plates, substantially as shown and described.

2. In an anti-friction bearing for vehicles, the combination of a sleeve the internal diameter of which is slightly larger than the spindle and having longitudinal ribs on its peripherical face, slots between said ribs, a recess around each slot, plates fitting said recesses, and friction-rollers of a diameter to just fit in the slots and between the plates and spindle, substantially as set forth.

3. In an anti-friction bearing for vehicles, the sleeve E, having longitudinal ribs $e$, slots F, and a recess around each slot, in combination with the plates H and friction-rollers F, substantially as set forth.

In testimony whereof I have signed my name to this specification, in the presence of two subscribing witnesses, on this 15th day of December, A. D. 1888.

HOSEA W. LIBBEY.

Witnesses:
CHAS. STEERE,
EDWIN PLANTA.